W. CHURCHILL.
LENS.
APPLICATION FILED FEB. 3, 1910.

1,033,780. Patented July 30, 1912.

UNITED STATES PATENT OFFICE.

WILLIAM CHURCHILL, OF CORNING, NEW YORK, ASSIGNOR TO CORNING GLASS WORKS, OF CORNING, NEW YORK, A CORPORATION OF NEW YORK.

LENS.

1,033,780.  Specification of Letters Patent.  Patented July 30, 1912.

Application filed February 3, 1910. Serial No. 541,836.

*To all whom it may concern:*

Be it known that I, WILLIAM CHURCHILL, a citizen of the United States of America, and a resident of Corning, county of Steuben, State of New York, have invented certain new and useful Improvements in Lenses, of which the following is a specification.

Certain disadvantages are present in the semaphore lens now in common use with a smooth outer convex face and a corrugated or stepped inner face. Among these disadvantages are the loss of light falling on the miters and projected thereby out of the edges of the lens at such an angle with the axis thereof as to render them useless for the purpose for which such lenses are used.

My invention has for its object to avoid these and other defects of the previous construction and for this purpose I employ what may be termed an inverted semaphore lens, that is one having a smooth convex rear face and a corrugated or stepped outer face, and further combine therewith a cover glass, which not only projects the corrugations of the outer face from the accumulation therein of dirt, snow, etc., but which may be so shaped as to possess optical properties.

My improved lens will be fully described in connection with the annexed drawings in which—

Figure 1:
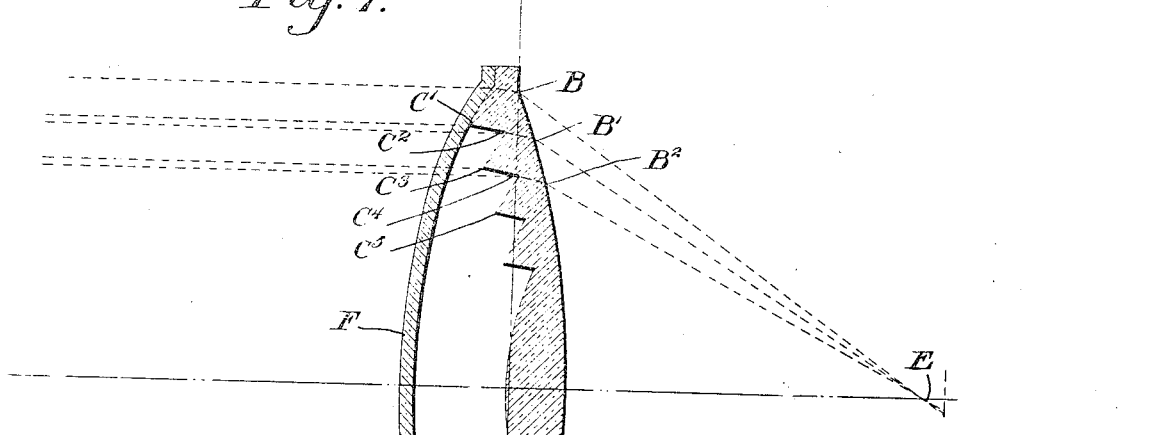
Figure 2:
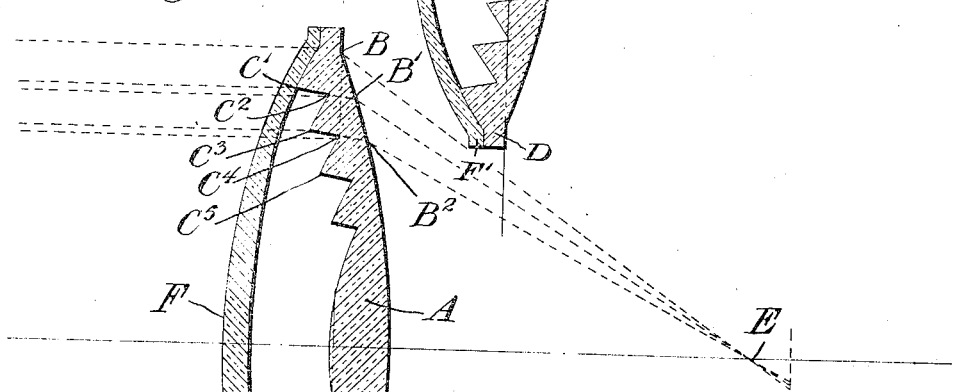

Figure 1 is a sectional view through a lens constructed in accordance with this invention. Fig. 2 is a corresponding view of another form in which a meniscus cover glass is used.

The element A of the lens has a convexed rear face B, B′, B², etc., and a front face composed of a series of zones C—C′, C²—C³, C⁴—C⁵, united by miters C′—C², C³—C⁴, etc., and is surrounded by a flange D, by which it may be held in a suitable casing. With such an element when properly placed in front of a source of illumination E, while there will be produced certain dark bands coinciding with the positions of the miters such bands do not indicate a loss of light, as is the case with the usual smooth face semaphore, this being due to the fact that the miters are located substantially in the path in which the rays from the source after refraction in the rear face, pass at the several miters through the element and hence practically none of the rays falling thereon are lost. This is illustrated by following the course of any ray E B², which falls upon the rear face of the lens at a proper point to be refracted therethrough in the line B²—C³ adjacent to the miter. It will be noted that the line of passage B²—B³ through the element is parallel with the face of the miter so that any ray falling upon the lens closer to the principal axis than the points B² will after passing through the element fall upon the zone C³—C⁴ and not upon the miter itself. This is an important advantage in this inverted lens in that it is not possible, due to the constructional demands, to place the miters when employed on the rear face of the lens in such planes as will not intercept the impinging rays, whereas with the inverted lens this may be easily done and in fact done to advantage as far as construction is concerned. Moreover the dark bands so produced by the miters are less in width with the inverted lens than with the usual semaphore.

In connection with railway or semaphore lenses it must be further remembered that it is not desirable to produce an absolutely parallel beam but on the contrary that one of gradually increasing diameter or spread is demanded. Among the advantages of the inverted lens here described is that it reduces the actual focal distance from the center of the lens to the flame thereby affording an increased amount of such spread, over and above that obtainable with the present form of semaphore lenses in which, as the lens projects out from the lamp casing the distance from the center of the lens to the flame is relatively great, being in the case of the 5⅜ inch lens with a 3¼ inch focus nearly 4½ inches. This difficulty cannot be merely overcome by flattening the smooth face semaphore lens because in that case the loss of light upon the miters is much increased and at the same time the spherical aberration becomes much greater, which while, of course, not as objectionable in railway lens as in those intended for optical work, is detrimental and which can be practically eliminated by the lens of the inverted type. It will be noted that the inverted lens here described has no projection of the lens beyond the case and hence the liability of the damage or breakage is much reduced.

To protect the zones and miters upon the outer face of the inverted lens both from injury and from the accumulation of foreign matter thereon a cover glass F may be placed upon the forward face thereof. This glass may be a plain, concavo-convex or may be a meniscus (as shown in Fig. 2), forming with the element A a doublet. By preference such glass cover is provided with a flange F' of the same diameter as the flange D of the element A so that it may be contained within the same mounting and may be so shaped as to fit snugly upon the outer zone C C' of such element.

Having thus described my invention, what I claim and desire to secure by Letters Patent is:—

1. A lens having a smooth curved refracting rear face and a stepped front face consisting of zones united by miters the miters being located substantially parallel to the path of the rays passing through the lens where such miters are located.

2. A lens having a smooth curved refracting convex rear face and a stepped front face consisting of zones united by miters in combination with a cover glass of concavo-convex form located upon the forward face of the lens and having a rear face of greater curvature than the anterior face of the lens, whereby the centers of the cover glass and lens are separated.

3. A lens comprising an element having a smooth convex rear refracting face and a front face consisting of zones united by miters, and a meniscus element located in front thereof, substantially as described.

4. A lens having a smooth convex refracting rear face and a stepped front face consisting of zones united by miters in combination with a cover glass of concavo-convex form located upon the forward face of the lens and fitting and resting upon the outer of said zones.

5. A lens having a smooth convex refracting rear face and a stepped front face consisting of zones united by miters located substantially parallel to the path of the rays passing through the lens where such miters are located in combination with a cover glass of concavo-convex form located upon the forward face of the lens.

6. A lens having a smooth convex refracting rear face and a stepped front face consisting of zones united by miters located substantially parallel to the path of the rays passing through the lens where such miters are located in combination with a cover glass in the form of a meniscus element located in the front thereof and forming with the main lens a doublet.

WILLIAM CHURCHILL.

Witnesses:
MARION A. WHITLOCK,
R. H. CURTIS.